United States Patent Office 3,825,630
Patented July 23, 1974

3,825,630
PHOSPHONATE CARBAMATES

Stephen B. Sello, Cedar Grove, and Bernard J. Gaj, Montclair, N.J., assignors to J. P. Stevens & Co., Inc., New York, N.Y.
No Drawing. Original application June 18, 1971, Ser. No. 154,690, now Patent No. 3,758,554. Divided and this application Apr. 30, 1973, Ser. No. 355,837
Int. Cl. C07f 9/40
U.S. Cl. 260—938    3 Claims

ABSTRACT OF THE DISCLOSURE

This invention relates to phosphorus-containing carbamates having at least one N-methylol or N-alkoxymethyl group. These compounds can be used to impart durable flame-retardant properties to cellulose-containing substrates.

---

This is a division of application Ser. No. 154,690, filed June 18, 1971, now U.S. Pat. 3,758,554.

The present invention relates to novel phosphorus-containing carbamates having at least one reactive N-methylol or N-alkoxymethyl group. Flame-retardant properties are imparted to cellulose-containing substrates by reacting the carbamate compounds with cellulosic hydroxyl groups.

The phosphorus-containing carbamates of this invention have the formula

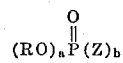

where

R is alkyl of 1 to 5 carbon atoms;
$a$ is an integer equal to $3-b$;
$b$ is an integer of 1 to 3; and
Z is a radical selected from the group consisting of (a) 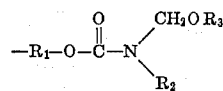

wherein
  $R_1$ is an alkylene radical of 1 to 5 carbon atoms;
  $R_2$ is hydrogen, alkyl of 1 to 5 carbon atoms or —$CH_2OR_3$;
  $R_3$ is hydrogen or alkyl of 1 to 5 carbon atoms; and (b) 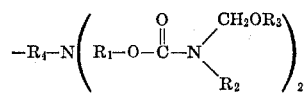

wherein
  $R_1$, $R_2$, and $R_3$ have the meanings given above; and
  $R_4$ is an alkylene radical of 1 to 5 carbon atoms.

Carbamates of this invention can be prepared by reacting a phosphorus-containing alcohol of the formula

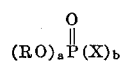

where X is —$R_1OH$ or —$R_4$—$N(R_1OH)_2$ and $R_1$ and $R_4$ have the meanings given above, with an isocyanate of the formula

where $R_5$ is hydrogen or alkyl of 1 to 5 carbon atoms, in presence of a basic solvent such as pyridine whereby reaction takes place at the —$R_1OH$ groups to give —$R_1OCONHR_5$ groups and then methylolating the resulting intermediate product by reaction with formaldehyde. This reaction is illustrated by the following equations in which the phosphorus-containing alcohol is tris-(hydroxymethyl) phosphine oxide and the isocyanate is methyl isocyanate.

(1) 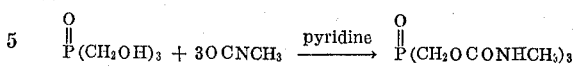

(2) 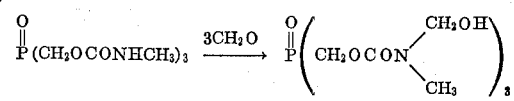

The reaction between the phosphorus-containing alcohol and the isocyanate can conveniently be conducted at reflux temperature. The methylolation can be carried out at a pH of 8–11 using an aqueous solution of formaldehyde or by using paraformaldehyde at an elevated temperature e.g. 60–70° C.

Carbamates of this invention can also be obtained by reacting the above-defined phosphorus-containing alcohols with phenylchloroformate to obtain a phenylcarbonate ester, reacting this ester with ammonia or alkylamine to obtain a carbamate intermediate by the conversion of the —$CH_2OCOC_6H_5$ groups to

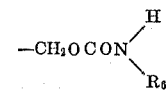

groups, where $R_6$ is hydrogen or alkyl of 1 to 5 carbon atoms, and then methylolating this intermediate with formaldehyde to obtain the desired phosphorus-containing carbamate. These reactions are illustrated by the following equations wherein the phosphorus-containing alcohol has the formula $$(C_2H_5O)_2P(O)CH_2N(CH_2CH_2OH)_2$$

and ammonia is used

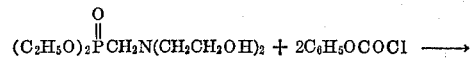

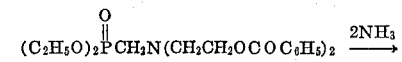

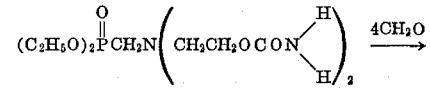

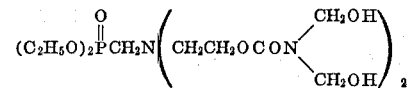

If the methylolation procedure of the two above-described processes is carried out using a solution of formaldehyde in an alkanol such as methyl or ethyl alcohol and the product obtained is acidified e.g. with HCl, the carbamate produced has N-alkoxymethyl groups in place of the N-hydroxymethyl groups shown in the above equations.

Representatives of the alcohols which are useful starting materials for the preparation of the phosphorus-containing carbamates of this invention are the following compounds:

(1) 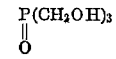

(2) 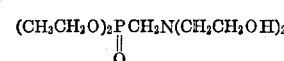

(3) 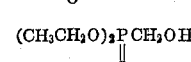

(4) 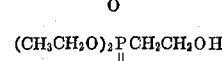

(5)          CH₃CH₂O P(CH₂OH)₂
                          ‖
                          O (6)          CH₃CH₂O P(CH₂CH₂OH)₂
                          ‖
                          O (7)               P(CH₂CH₂OH)₃
                          ‖
                          O (8)               P(CH₂CH₂CH₂OH)
                          ‖
                          O

The compounds of this invention are useful as durable flame-retardant agents for cellulose-containing substrates. The N-hydroxymethyl or N-alkoxymethyl groups react with cellulosic hydroxyl groups forming water-insoluble cellulose ethers which contain both nitrogen and phosphorus. This reaction is carried out by heating at a temperature of about 60° to 200° C., preferably at 120° to 180° C., in the presence of an acidic catalyst.

Suitable acidic compounds for catalyzing the reaction of the carbamates of this invention with cellulosic hydroxyl groups include the ammonium or amine salts of mineral acids; the chlorides and nitrates of zinc and magnesium; acid fluoride salts; and zinc fluoroborate. In addition to the above salts, non-volatile acids of moderate strength such as citric acid and sodium hydrogen sulfate can also be employed. The amount of acidic catalyst added to the treating bath should be equal to about 0.2 to 10% by weight based on the weight of the treating bath, and preferably from 0.3 to 4.0% by weight.

The phosphorus-containing carbamate and the acidic catalyst can be applied from an aqueous solution or dispersion by padding, brushing, spraying, or other impregnation technique. It is preferable that after formation of the reaction product the add-on of bound phosphorus be about 0.5 to 4.0% by weight based on the weight of the finished product, i.e., substrate plus flame-retardant reaction product. The concentration of the carbamate reactant in the impregnation bath and the wet pickup are adjusted to give the desired add-ons of phosphorus. The add-on of bound nitrogen also contributes to the flame-retardant properties of the treated substrate. The amount of nitrogen in the treated product can be increased by using one or more nitrogen-containing compounds in conjunction with the carbamates of the invention. The add-on of bound nitrogen should be about 1.0 to 15% by weight based on the weight of the finished product.

The phosphorus-containing carbamates can be used in conjunction with a nitrogen-containing, durable-press resin such as N-hydroxymethyl or N-alkoxymethyl derivatives of non-phosphorus-containing carbamates, dimethylol urea, dimethylol alkylene urea, dimethylol dihydroxy alkylene urea, polymethylol uron, polymethylol melamines, etc. In such cases, a portion of the nitrogen required for flame retardancy can be supplied by the durable-press resin. The phosphorus-containing carbamate and the durable-press resin can be applied in a single step operation or by sequential treatments with either compound being applied first. The reaction of the durable-press with cellulose is catalyzed with the same type of acidic catalyst used with the phosphorus-containing carbamate.

If desired, polymethylol melamine resins can be employed using a wet fixation technique so that an insoluble nitrogen-containing product is formed on the substrate with little or no reaction with the cellulose. In the wet fixation procedure (e.g., steaming) the moisture content of the substrate is maintained at a minimum of 10% by weight based on the weight of the substrate during the reaction of the polymethylol melamine to form an insoluble product. When the phosphorus-containing carbamate and the polymethylol melamine are applied to a farbic simultaneously, it is preferable to first steam the fabric to self-polymerize the polymethylol melamine and then to dry heat the fabric in the presence of an acidic catalyst to react the carbamate with cellulosic hydroxyl groups.

The cellulosic substrate to be rendered flame retardant should contain at least 30 weight percent cellulose. The substrate can be a yarn or thread, or a woven knitted or non-woven fabric.

Particularly outstanding compounds within the scope of the present invention which give excellent flame-retardant properties are compounds of the formula

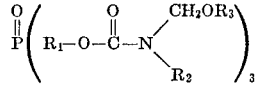

where $R_1$, $R_2$ and $R_3$ have the meanings given above. Another preferred group of carbamate compounds within the scope of this invention has the formula

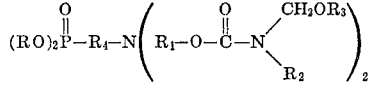

where $R_1$, $R_2$, $R_3$, and $R_4$ have the meanings given above.

The following examples are given to further illustrate the invention, but it is to be understood that the invention is not to be limited in any way by the details described therein. In the examples percents are by weights unless otherwise specified.

ANALYTICAL AND TEST METHODS EMPLOYED IN THE EXAMPLES

Bound Nitrogen, N in percent: Determined by Kjeldahl digestion, followed by titration of the distilled ammonia.

Bound Phosphorus, P in percent: Determined by Kjeldahl digestion, followed by colorimetric analysis employing acetone-water to intensify the phosphomolybdate color: Bernhart et al., *Anal. Chem.*, Vol. 27, 440, (1955).

Flame Retardancy (Vertical Test), char length in inches: AATCC 34-1966. A char length of about 6 inches or shorter is passable.

Flame Retardancy (Limiting Oxygen Index), the minimum value of the volume fraction (expressed in decimal form) of oxygen in a metered oxygen-nitrogen mixture, using a flammability index tester (Type FL-101, General Electric Co.): C. P. Fenimore and F. J. Martin, *Combustion and Flame*, Vol. 10, No. 2, 135 (June 1966), and *Modern Plastics*, Vol. 43, No. 11, 141 (November 1966). Generally, a limiting oxygen index of about 0.260 or greater is passable.

Dry Crease Recovery, total of angular degrees in warp (W) and filling (F) directions: ASTM D1295-60T.

Flex Abrasion Resistance, in cycles: ASTM D1175-44T (0.5-pound head weight and 2-pound toggle tension on a Stoll Flex Abrader).

Laundering: AATCC 88A-1964T, Test III, home-type washer, 5-pound load, full cycle, 60° C., synthetic detergent; tumble drying.

Tear Strength (Elmendorf), in pounds: ASTM D1424-59.

Tensile (Breaking) Strength: (One-inch ravelled strip), in pounds: ASTM D1682-63.

ABBREVIATIONS

OWB: On the weight of the bath used for padding, in percent.

OWF: On the weight of the fabric, in percent.

Wet pickup (in percent) multiplied by OWB/100% equals OWF (in percent).

TMM: Trimethylol melamine, (s-triazine-2,4,6-triyl-triimino)-trimethanol.

BEL: Burned entire length of fabric sample in vertical flame test.

EXAMPLE 1

The compound

P(O)(CH$_2$OCONHCH$_3$)$_3$ was prepared by adding 695 grams of methyl isocyanate to a suspension of 472 grams of tris-(hydroxymethyl) phosphine oxide in a mixture of 2500 ml. of benzene and 180 ml. of pyridine at 60–70° C. followed by 2 hours at reflux. The separated solid was crystallized from methyl alcohol to give 821 grams of product, m.p. 119–120° C.; N found: 13.49%; theory 13.5%.

A quantity of 233 grams of the above compound was stirred at room temperature with 200 grams of 37% aqueous formaldehyde solution at a pH of 8–9 for 20 hours. The free formaldehyde content of the aqueous solution was reduced to 4.75% and there was produced the compound

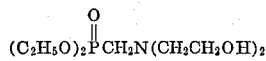

The aqueous solution of desired carbamate compound produced by the methylolation step can be neutralized with an acid such as HCl and then used directly in the treatment of a cellulose-containing substrate.

EXAMPLE 2

Using the procedure described in Example 1, 627.5 grams of methyl isocyanate was added at 40–50° C. to a mixture of 1275 grams of

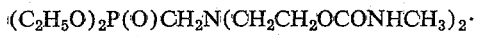

2000 ml. of benzene and 100 grams of pyridine, the reaction mixture was refluxed for 5 hours and stripped of solvents under vacuo leaving a viscous liquid compound (11.43% N; theory 11.4%) having the formula (C$_2$H$_5$O)$_2$P(O)CH$_2$N(CH$_2$CH$_2$OCONHCH$_3$)$_2$.

A mixture of 904 grams of the compound of the above formula and 169 grams of paraformaldehyde was stirred for four hours at 60–70° C. while maintaining a pH of 8–9 with 6N sodium hydroxide. A compound was produced having the formula

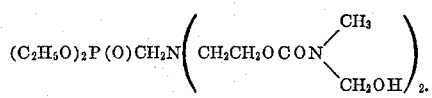

EXAMPLE 3

1252 grams of phenyl chloroformate was added to a solution of 1024 grams of (C$_2$H$_5$O)$_2$P(O)CH$_2$N(CH$_2$CH$_2$OH)$_2$ in 2000 ml. of pyridine while cooling in a tap water bath. The product was poured into 1200 ml. of distilled water and the layers separated. The wash procedure was repeated several times and the residue was dried ovr MgSO$_4$ in 1:1 benzene/chloroform and stripped of solvents leaving 1478 grams of bis(carbonate ester) of the formula (C$_2$H$_5$O)$_2$P(O)CH$_2$N(CH$_2$CH$_2$OCOOC$_6$H$_5$)$_2$.

Ammonia gas was bubbled through a 2000 ml. pyridine solution containing 1453 grams of the above bis(carbonate ester) at 20–30° C. with cooling. When the exotherm subsided the mixture was poured into 2 liters of water and the lower layer was dried over anhydrous MgSO$_4$ in 1:1 benzene/chloroform. Removal of the solvent and vacuum stripping at 90–100° C. left a mixture of the desired intermediate compound and phenol which was separated by treatment with dilute sodium hydroxide (10%) solution and extraction with chloroform. Removal of the chloroform from the dried extracts gave 137.5 grams of compound having the formula (C$_2$H$_5$O)$_2$P(O)CH$_2$N(CH$_2$CH$_2$OCONH$_2$)$_2$ which were treated with 184 grams of 37% aqueous formaldehyde solution at a pH 9.5–10 and a temperature of 60–70° C. for 14 hours, after which the free formaldehyde content was 5.75%. There was produced a compound of the formula

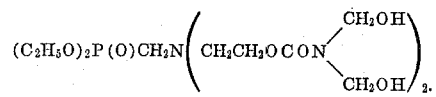

If the procedure of Example 3 is repeated using

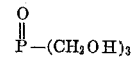

as the phosphorus-containing alcohol starting material, there is produced the compound

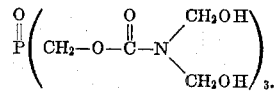

EXAMPLE 4

Samples of the product of Example 3, phosphorus-containing carbamate having the following formula

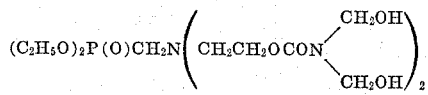

were dissolved in a 2:1 dimethyl formamide/water mixture and either MgCl$_2$ or an alkanolamine hydrochloride (AHCl) of the formula HOCH$_2$C(CH$_3$)$_2$NH$_3$Cl was added as catalyst. Concentrations of the reagent and catalyst are specified in the accompanying table.

Samples of sheeting fabric woven from all-cotton yarn in a plain weave, weighing 4.5 ounces per square yard, were padded in the treating solutions with the pressure of the squeeze rolls adjusted to give a wet pickup of about 80–100%. The padded samples of fabric were dried in a forced draft laboratory oven at approximately 66° C., then cured. The conditions of the curing are specified in the accompanying table. The specimens of the fabric were washed for 15 minutes at approximately 88° C. in an aqueous solution of which 0.1% was sodium carbonate and 0.1% was a non-ionic detergent (Triton X–100, a mixture of closely related compounds having the formula p-[(CH$_3$)$_3$CCH$_2$C(CH$_3$)$_2$]C$_6$H$_4$(—OCH$_2$CH$_2$—)$_x$OH where $x$ has an average value of about 10). Finally, the fabric was neutralized in dilute acetic acid solution, rinsed in water, dried on a frame in a forced-draft oven and evaluated.

TABLE FOR EXAMPLE 4

|  |  |  |  |  | Untreated |
|---|---|---|---|---|---|
| Percent reagent, OWF | 33.6 | 19.4 | 32.7 | 19.1 | |
| Catalyst | MgCl$_2$ | MgCl$_2$ | AHCl | AHCl | |
| Percent catalyst, OWB | 1 | 1 | 2 | 2 | |
| Curing | 170° C. for 5 minutes | | | | |
| Weight gain | 22.8 | 13.3 | 12.9 | 14.0 | |
| Percent bound phosphorus* | | 1.2 | | 1.6 | |
| Percent bound nitrogen* | | 1.2 | | 1.7 | |
| Limiting oxygen index | .27 | .21 | .26 | .23 | 0.18 |

*Weight percent of treated fabric.

EXAMPLE 5

Example 4 was repeated on cotton sheeting samples pretreated with trimethylol melamine (TMM).

The pretreatment was carried out using the following method:

Samples of cotton fabric were padded with an 18% aqueous solution of trimethylol melamine containing 0.3% H$_2$O$_2$ on a laboratory padder with the pressure of the squeeze rolls adjusted to give 100% wet pickup. The samples were dried to 20% moisture content, wrapped in a polyethylene sheet, and allowed to stand for 24 hours at room temperature, then washed and dried. By this procedure trimethylol melamine was insolubilized in essentially quantitative yield.

The results of the treatment of the trimethylol melamine pretreated samples (weight gain: 14.8%, N content: 4.5%) with the product of Example 3, phosphorus-containing carbamate having the following formula

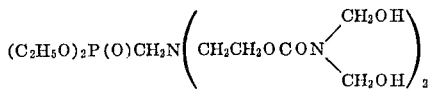

are shown in the following table:

TABLE FOR EXAMPLE 5

|  |  |  |  |  | Untreated |
| --- | --- | --- | --- | --- | --- |
| Percent reagent, OWF | 31.8 | 19.1 | 31.2 | 18.4 |  |
| Catalyst | MgCl$_2$ | MgCl$_2$ | AHCl | AHCl |  |
| Percent catalyst, OWB | 1 | 1 | 2 | 2 |  |
| Curing | 170° C. for 5 minutes |  |  |  |  |
| Weight gain | 22.5 | 12.9 | 24.1 | 14.0 |  |
| Percent bound phosphorus* | 1.2 |  | 1.2 |  |  |
| Percent bound nitrogen* |  |  | 4.9 |  |  |
| Limiting oxygen index | .29 | .24 | .30 | .28 | .18 |

*Weight percent of treated fabric.

EXAMPLE 6

The product of Example 1, phosphorus-containing carbamate having the following formula

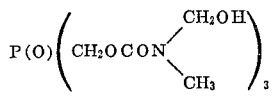

was applied from a 31.0% aqueous solution containing 2% of the alkanol amine hydrochloride (AHCl) catalyst described in Example 4 to a fabric sample woven from twisted all-cotton yarn in a twill weave weighing 8 ounces per square yard. The application was carried out on a laboratory padder with the pressure of squeeze rolls adjusted to attain 86% wet pickup. The padded sample was dried, cured, washed and dried as described in Example 4. The so treated sample had a weight gain of 21.6% corresponding to 93% reaction yield.

The treated sample was after-treated with 15% aqueous trimethylol melamine solution containing 0.3% H$_2$O$_2$ on a laboratory padder with the pressure of squeeze rolls adjusted to give 65% wet pickup. The sample was dried to 20-30% moisture content, steamed in a laboratory steamer for 8 minutes, washed and dried. The so treated sample had an additional 6.7% weight gain.

The results of the above applications before and after TMM treatment are shown in the accompanying table.

TABLE FOR EXAMPLE 6

|  | Before TMM treatment | After TMM treatment |
| --- | --- | --- |
| Percent bound phosphorus | 1.5 | 1.4 |
| Percent bound nitrogen | 1.8 | 4.3 |
| Char length in vert. flame test | BEL | 5.5 |

EXAMPLE 7

Aqueous solutions containing a mixture of the product of Example 1, phosphorus-containing carbamate having the following formula

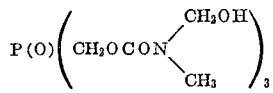

trimethylol melamine, and one of the acid catalysts described in Example 4 were applied to cotton twill fabric samples using the method described in Example 4. The results of the treatment are shown in the accompanying table:

TABLE FOR EXAMPLE 7

|  |  |  |  | Untreated |
| --- | --- | --- | --- | --- |
| Percent P containing reagent, OWF | 21.3 | 17.1 | 21.9 |  |
| Percent TMM, OWF | 14.4 | 11.5 | 14.8 |  |
| Catalyst | AHCl | AHCl | MgCl$_2$ |  |
| Percent catalyst, OWB | 2 | 2 | 1 |  |
| Curing (steam plus cure) | (*) | (*) | (*) |  |
| Percent: |  |  |  |  |
| Weight gain | 26.5 | 21.2 | 21.8 |  |
| P | 1.0 |  | 0.7 |  |
| N | 5.9 |  | 5.6 |  |
| Char Length in vertical test: |  |  |  |  |
| Original | 3.5 | 4.2 | 5.6 | BEL |
| 10L | 4.2 | 4.2 | 5.6 |  |
| 25L | 4.2 | 5.2 | 5.2 |  |
| 50L | 3.5 | 5.7 | 8.5 |  |
| Tensile strength 1" strip—W | 176 | 162 | 149 | 183 |
| Tear strength, Elmendorf—F | 1.2 | 1.8 | 1.2 | 5.6 |
| Crease recovery, W + F, dry | 238 | 227 | 243 | 178 |
| Flex abr.—W | 2,475 | 675 | 875 | 2,425 |

*3 minutes steaming followed by 5 minutes heat curing at 163° C.

It will be apparent that many modifications and variations can be effected without departing from the scope of the novel concepts of the present invention, and the illustrative details are not to be construed as imposing undue limitations on the invention.

What is claimed is:
1. A phosphorus-containing carbamate of the formula

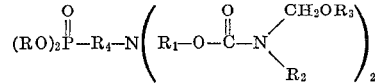

wherein
R is alkyl of 1 to 5 carbon atoms;
R$_1$ is an alkylene radical of 1 to 5 carbon atoms;
R$_2$ is hydrogen, alkyl of 1 to 5 carbon atoms or CH$_2$OR$_3$;
R$_3$ is hydrogen or alkyl of 1 to 5 carbon atoms; and
R$_4$ is an alkylene radical of 1 to 5 carbon atoms.

2. A compound of the formula

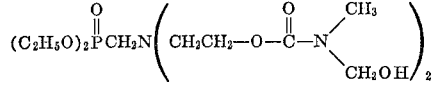

3. A compound of the formula

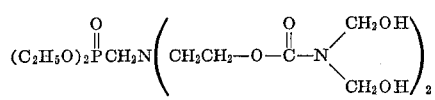

References Cited

UNITED STATES PATENTS 3,763,283   10/1973   Curgan _____ 260—938

ANTON H. SUTTO, Primary Examiner

U.S. Cl. X.R.

117—136; 260—968